US008374458B2

(12) United States Patent
Inoue

(10) Patent No.: US 8,374,458 B2
(45) Date of Patent: Feb. 12, 2013

(54) TONE CORRECTING METHOD, TONE CORRECTING APPARATUS, TONE CORRECTING PROGRAM, AND IMAGE EQUIPMENT

(75) Inventor: Akira Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 1283 days.

(21) Appl. No.: 12/086,258

(22) PCT Filed: Dec. 21, 2006

(86) PCT No.: PCT/JP2006/325500
§ 371 (c)(1),
(2), (4) Date: Jun. 9, 2008

(87) PCT Pub. No.: WO2007/072907
PCT Pub. Date: Jun. 28, 2007

(65) Prior Publication Data
US 2009/0309994 A1 Dec. 17, 2009

(30) Foreign Application Priority Data
Dec. 21, 2005 (JP) .................................. 2005-367989

(51) Int. Cl.
*G06K 9/40* (2006.01)
(52) U.S. Cl. ........................................................ 382/274
(58) Field of Classification Search .................. 348/254, 348/650, 652, E9.054; 382/167, 274
See application file for complete search history.

(56) References Cited

U.S. PATENT DOCUMENTS 5,638,136 A * 6/1997 Kojima et al. ................. 348/653
7,016,075 B1 3/2006 Tsukada
8,059,311 B2 * 11/2011 Chang ............................. 358/1.9
2004/0234155 A1 * 11/2004 Hoshuyama ................... 382/254
2005/0012832 A1 1/2005 Yano
2005/0025356 A1 2/2005 Fukuda (Continued)

FOREIGN PATENT DOCUMENTS

JP 08-110603 4/1996
JP 10-150566 6/1998

(Continued)

OTHER PUBLICATIONS

M. Kosugi, "Human Face Search and Location in a Scene by Multi-Pyramid Architecture for Personal Identification," Institute of Electronics, Journal of Information and Communication Engineers, Apr. 1994, vol. J77-D-II, No. 4, pp. 672-681.

(Continued)

*Primary Examiner* — Gregory F Cunningham
(74) *Attorney, Agent, or Firm* — Foley & Lardner LLP

(57) ABSTRACT

A face detecting unit detects presence/non-presence of a face and its position from an input image or its reduced image. A parameter calculation control unit calculates a correction parameter according to the presence/non-presence of the face. When the face is detected, a face area correction parameter calculating unit calculates a correction parameter having characteristics such that as a representative luminance value is larger, the image becomes darker, and as smaller, the image becomes brighter based on a boundary luminance level. When a face is not detected, a standard correction parameter calculating unit 4 calculates the correction parameter based on image data of the input image or its reduced image regardless of image contents. An image converting unit converts a pixel value of the input image using the obtained correction parameter so as to correct tone.

12 Claims, 11 Drawing Sheets

U.S. PATENT DOCUMENTS

| | | |
|---|---|---|
| 2005/0227964 A1 | 10/2005 | Fawzi et al. |
| 2006/0125731 A1* | 6/2006 | Yui ............................... 345/75.2 |
| 2010/0195901 A1* | 8/2010 | Andrus et al. ................ 382/162 |

FOREIGN PATENT DOCUMENTS

| | | |
|---|---|---|
| JP | 11-168620 | 6/1999 |
| JP | 11-267937 | 10/1999 |
| JP | 11-328359 | 11/1999 |
| JP | 2000-137805 A | 5/2000 |
| JP | 2000-187722 A | 7/2000 |
| JP | 2000-196890 A | 7/2000 |
| JP | 2000-261640 A | 9/2000 |
| JP | 2000-307896 A | 11/2000 |
| JP | 2001-092956 A | 4/2001 |
| JP | 2002-207468 (A) | 7/2002 |
| JP | 2004-215235 A | 7/2004 |
| JP | 2004-240829 A | 8/2004 |
| JP | 2005-038119 A | 2/2005 |
| JP | 2005-051407 A | 2/2005 |
| JP | 2005-252392 A | 9/2005 |

OTHER PUBLICATIONS

M. Turk et al., "Face Recognition on Using Eigenfaces," Proceedings of IEEE, CVPR91, Jun. 1991, pp. 586-591.

* cited by examiner

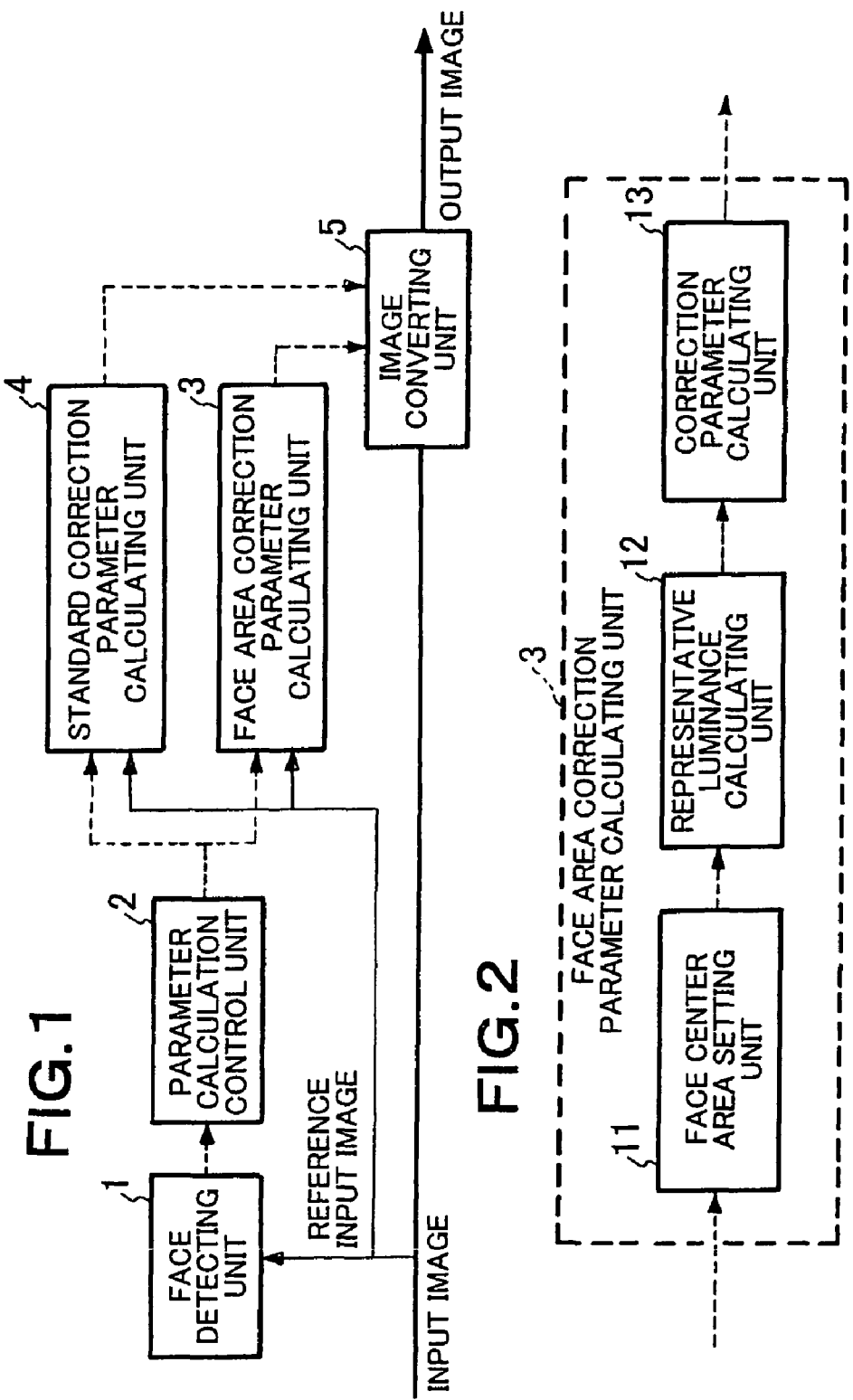

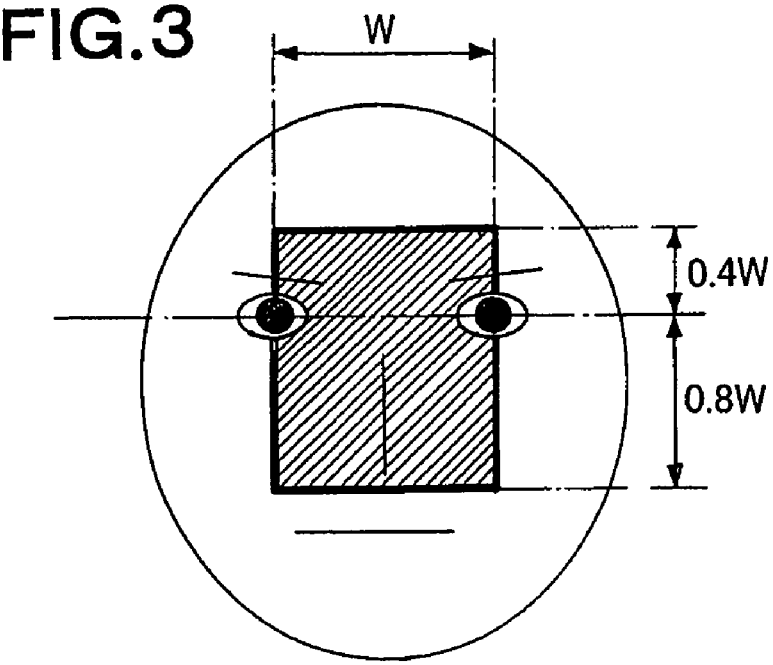
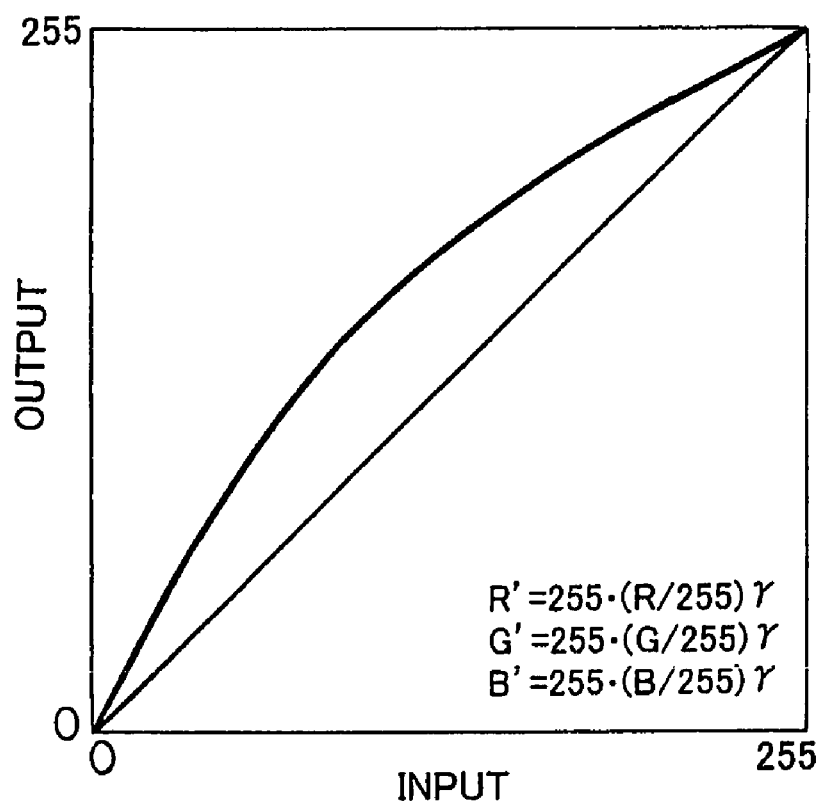

| | CONTROL POINT MOVING DISTANCE | | |
|---|---|---|---|
| | d1 | d2 | d3 |
| REPRESENTATIVE LUMINANCE VALUE Yf | 10 | +10 | +40 | +5 |
| | 20 | +7 | +36 | +5 |
| | ⋮ | ⋮ | ⋮ | ⋮ |
| | 150 | 0 | 0 | 0 |
| | ⋮ | ⋮ | ⋮ | ⋮ |
| | 200 | −10 | −30 | −2 |
| | ⋮ | ⋮ | ⋮ | ⋮ |

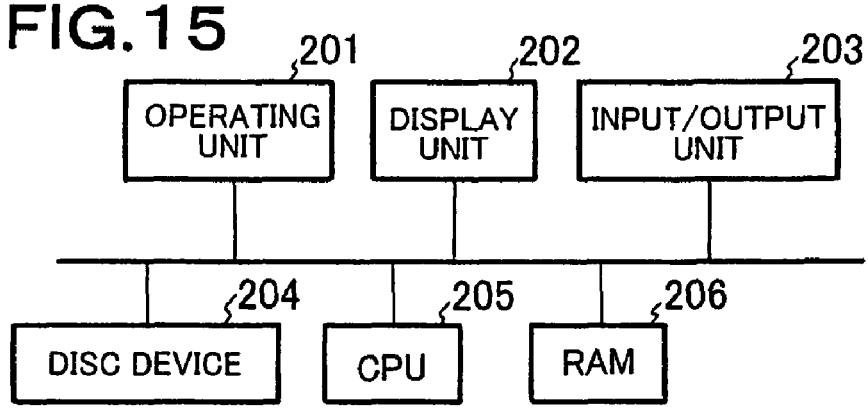
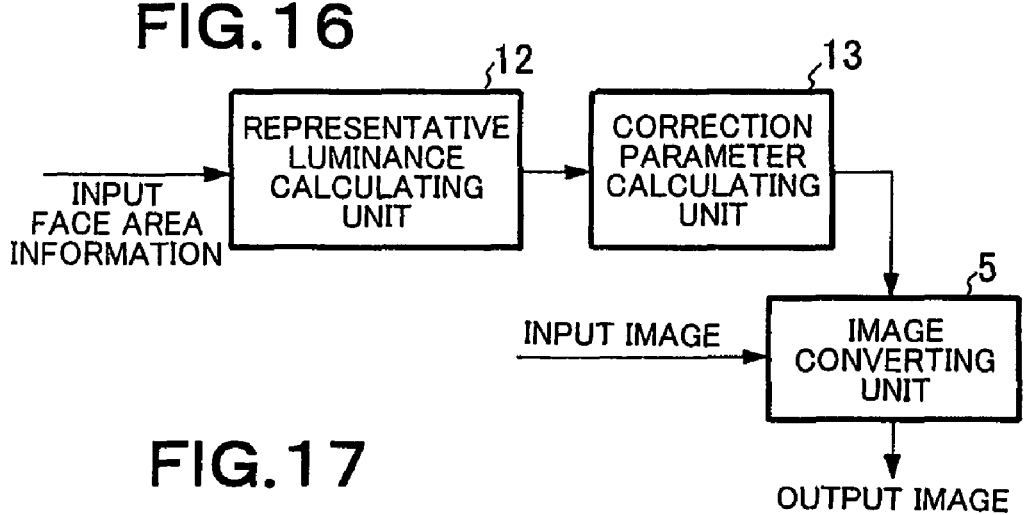
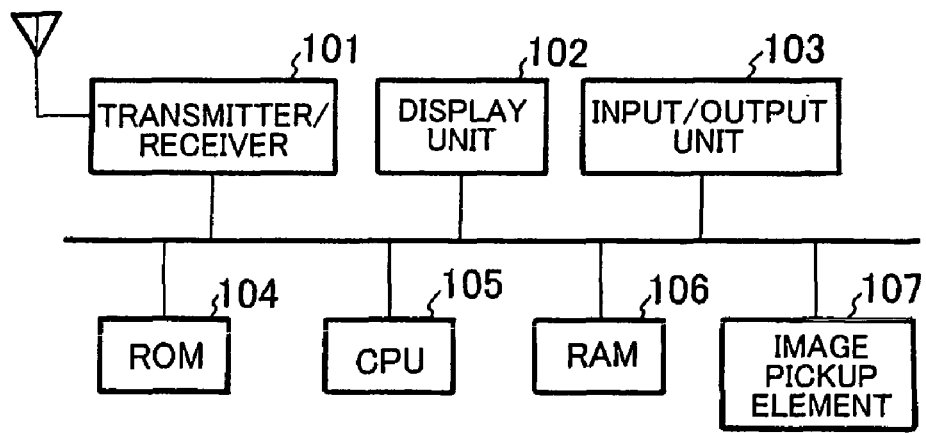

TONE CORRECTING METHOD, TONE CORRECTING APPARATUS, TONE CORRECTING PROGRAM, AND IMAGE EQUIPMENT

This application is the National Phase of PCT/JP2006/325500, filed Dec. 21, 2006, which claims priority to Japanese Application No. 2005-367989, filed Dec. 21, 2005, the disclosures of which are hereby incorporated by reference in their entirety.

TECHNICAL FIELD

The present invention relates to a tone correcting method, a tone correcting apparatus and a tone correcting program which correct tones of images, and image equipment.

BACKGROUND ART

An example of tone correcting apparatuses which correct tones of images is a lightness (value) correcting apparatus which is described in Patent Document 1. The lightness correcting apparatus described in Patent Document 1 divides an image into some areas, and calculates a parameter on the basis of average luminance of the respective divided areas, so as to make a gamma correction.

A method for extracting a human skin area on the basis of color information and correcting a color of the human skin area into a desired skin color on the basis of a parameter determined in advance (for example, Patent Document 2) is used as a method for correcting a tone of a figure image. Patent Document 3 describes an image processing method for processing an image by using a face detecting unit. With the image processing method described in Patent Document 3, the face detecting unit obtains face area image data SH, and determines an image state such as backlight on the basis of a characteristic value of SH. A desired color skin image and an original image are weighted by weighting coefficients obtained by using the determined image state and they are added, so that the image process is executed. Further, Patent Document 4 describes an image processing method which corrects density so that a density value of a face area falls within a target range.

Further, Patent Document 5 describes an image processing method for determining a correction parameter on the basis of image information attached to an image to be corrected so as to execute an image process. Patent Document 5 describes that a gamma correction value is determined on the basis of reduced image (preview) data of an input image and thus a suitable image correcting process can be executed for a short time.

Patent Docent 1: JP-A 10-150566 (paragraphs 0013-0014)
Patent Document 2: JP-A 11-267937 (paragraphs 0006-0008)
Patent Document 3: JP-A 11-328359 (paragraphs 0016-0023)
Patent Document 4: JP-A 2000-196890 (paragraph 0005)
Patent Document 5: JP-A 2000-137805 (paragraphs 0017-0018)

DISCLOSURE OF THE INVENTION

Problem to be Solved by the Invention

For example, when an image is a figure image photographed against the sun, the figure image cannot be always corrected into a figure image with satisfactory visibility by the correcting methods described in Patent Documents 1 and 2. Since the lightness correcting apparatus of Patent Document 1 does not determine whether an image includes a figure, even if the whole image can be corrected so as to have satisfactory visibility, this image does not always have satisfactory visibility as the figure image. That is to say, a skin color of a figure is not always corrected into a preferable skin color.

In the tone correcting method of Patent Document 2, a human skin is tried to be detected on the basis of color information, but in a case of a extreme backlight state, the skin color might deviate from normal distribution.

Further, even if a face detecting unit is provided, an operation which requires a large capacity of memory is necessary, and thus the processing time becomes long. In the image processing method of Patent Document 3, since a face image whose color skin is converted into a desired skin color and a background image other than the face area are synthesized by weighting, a frame memory for retaining image data is necessary. In the image processing method of Patent Document 4, since the conversion into a density value is necessary, operating units for respective pixels and a memory for saving density images are necessary.

In the image processing method described of Patent Document 5, an optimum correction parameter cannot be always determined. In the image processing method of Patent Document 5, a calculating formula: gamma=in (0.5)/In(Lv) is derived as a calculating formula for obtaining a gamma correction value on the basis of a luminance average Lv of all the pixels. According to this calculating formula, an output image is generated so that the luminance average becomes constant. Therefore, for example, when a too bright image or a too dark image is input, the image is excessively enhanced, and thus the quality is deteriorated. Further, since logarithmic conversion is necessary, a processing load is applied to the calculation.

It is, therefore, an object of the present invention to provide a tone correcting method, a tone correcting apparatus and a tone correcting program which can automatically correct tone so that even a figure image photographed against the sun is converted into a figure image with satisfactory visibility. Further, it is another object of the present invention to reduce a memory capacity necessary for the operation of the tone correction and the number of operating times. The figure image with satisfactory visibility means an image having luminance for giving a preferable skin color of a face portion in a tone balance of the whole image.

Means to Solve the Problem

A tone correcting method of the present invention for correcting tone of an image, is characterized by including:

a step of calculating a representative luminance value representing luminance components of pixels included in a specific area of the image extracted from the image;

a step of calculating a correction parameter for correcting the tone of the image on the basis of the representative luminance value and a predetermined boundary value of a predetermined luminance component; and;

a step of converting the pixel value of the image by using the correction parameter. An image which is seen at the time of extracting the specific area and an image which is seen at the time of calculating the representative luminance value may be reduced images, for example, as long as they represent the same contents as those of the image to be corrected.

A tone correcting apparatus for correcting tone of an image according to the present invention is characterized by including;

a specific area correction parameter calculating unit for calculating a correction parameter for correcting the tone of the image on the basis of a value showing a luminance component of the pixel included in a specific area of the image extracted from the image and a predetermined boundary value of the luminance component; and a pixel converting unit for converting a pixel value of the image using the correction parameter.

A tone correcting program for correcting tone of an image according to the present invention, is characterized by allowing a computer to execute:

a process for extracting a specific area from the image;

a process for calculating a correction parameter as a parameter for correcting the tone of the image on the basis of a value showing a luminance component of a pixel included in the specific image and a boundary value of the a predetermined luminance component; and a process for converting a pixel value of the image using the correction parameter.

Effect of the Invention

According to the present invention, since the correction parameter is calculated based on the value showing the luminance component of the pixel included in the specific area of the input image and the boundary value of the predetermined luminance component, for example, the tone correction such that a face portion of the image (backlight image) whose face photographed against the sun is dark is made to be bright can be realized. Further, the tone correction where a fluctuation is repressed can be realized not only for a backlight image but also for the image on the specific area photographed with follow light. In the present invention, the correction parameter is a parameter which is used for conversion calculation for correcting luminance tone.

BRIEF DESCRIPTION OF THE DRAWINGS

FIG. 1 is a block diagram illustrating a constitutional example of a tone correcting apparatus according to a first embodiment;

FIG. 2 is a block diagram illustrating a constitutional example of a face area correction parameter calculating unit 3;

FIG. 3 is an explanatory diagram illustrating a setting example of a face center area;

FIG. 4 is an explanatory diagram illustrating one example of a tone curve obtained by γ correction;

FIG. 15 is a block diagram illustrating one constitutional example of a personal computer;

FIG. 16 is a block diagram illustrating a constitutional example of the tone correcting apparatus according to another embodiment; and FIG. 17 is a block diagram illustrating a constitution of a cellular phone with a camera as an example of image equipment of the present invention;

DESCRIPTION OF REFERENCE SYMBOLS

Figure 5:
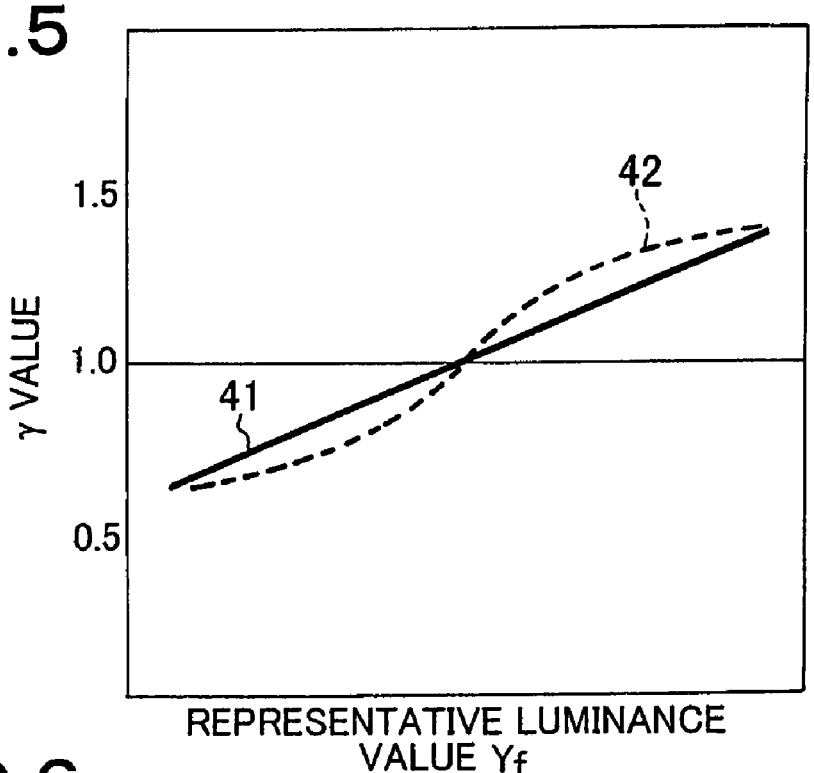
FIG. 5 is an explanatory diagram illustrating one example of characteristics of conversion from a representative luminance value into a γ value.

| | |
|---|---|
| 1: | face detecting unit |
| 2: | parameter calculation control unit |
| 3: | face area correction parameter calculating unit |
| 11: | face center area setting unit |
| 12: | representative luminance calculating unit |
| 13: | correction parameter calculating unit |
| 4: | standard correction parameter calculating unit |
| 5: | image converting unit |
| 21: | plural-faces repetition determining unit |
| 22: | correction parameter integrating unit |
| 31: | face-emphasized correction parameter calculating unit |
| 32: | face-emphasized image converting unit |

BEST MODE FOR CARRYING OUT THE INVENTION

First Embodiment

An embodiment of the present invention is described below with reference to drawings. FIG. 1 is a block diagram illustrating a constitutional example of a tone correcting apparatus according to the first embodiment of the present invention. The tone correcting apparatus shown in FIG. 1 has a face detecting unit 1, a parameter calculation control unit 2, a face area correction parameter calculating unit 3, a standard correction parameter calculating unit 4, and an image converting unit 5 to be a pixel converting unit. The tone correcting apparatus is realized by an information processing apparatus such as a personal computer which operates according to a program. The function of the apparatus is realized not only by software but also by exclusive ICs (hard ware) which configure respective components of the tone correcting apparatus or a exclusive IC (hard ware) which integrates respective components of the tone correcting apparatus. In the first embodiment, the tone correcting program for correcting tone of an image is stored in a storage device such as a hard disc of an information processing apparatus realizing the tone correcting apparatus.

FIG. 15 is a block diagram illustrating one constitutional example of a personal computer. The tone correcting program for correcting tone of an image is stored in a disc apparatus 204 such as a hard disc, and a CPU 205 executes the tone correcting program according to a procedure shown in a flow chart of FIG. 9. A RAM 206 stores image data input through an input/output unit 203 and data necessary for executing the program therein. The input image and an image output after the tone correction are displayed on a display unit 202 such as a liquid crystal display device (LCD). An operating unit 201 controls starting or suspension of the program running by means of a keyboard, for example. The image output after the tone correction is saved in the disc device 204, or is output into a printer via the input/output unit 203, or is transmitted via a network from the input/output unit 203. The present invention can be held as a computer readable recording medium which records the tone correcting program. Such a recording medium is not limited to the recording medium such as a hard disc built into the computer, but includes removal recording media such as CDROM, DVD and flash memory.

The face detecting unit 1 analyzes an input image and detects presence/non-presence of a face and a position of a face. The face detecting unit 1 refers to image data (information obtained by digitizing an image) of the input image, determines presence/non-presence of a face on the image using pattern recognition, and when detecting the face, detects a position of the face. The face detecting unit 1 outputs a coordinate of a feature point (for example, coordinates of eye positions) of the face on the input image as information representing the position of the face.

The face detecting unit 1 may carry out template matching using a shading pattern so as to detect a face. The template matching method is described in, for example, literature "Shin Kosugi, 'Searching and Locating of Face in Scene Using Multiple Pyramid for Identifying Individuals', Institute of Electronics, Journal of Information and Communication Engineers, April, 1994, Vol. J77-D-II, No. 4, p. 672-681". Further, locating is carried out by using an eigenvector spyphoto distance so that the position can be detected. The locating unit is described in, for example, literature "M. Turk, A. Pentland, 'Face Recognition on Using Eigenfaces', Proceedings of IEEE, CVPR91, June 1991, p. 586-591".

The face detecting unit 1 may calculates face detection reliableness representing reliableness of a detected face pattern at the time of detecting the face. As the face detection reliableness, a difference between a feature quantity of the pattern recognition obtained at the time of detecting a face and a feature quantity of an input image can be used. Further, an inverse number of the difference may be used so that as the reliableness is higher, the difference has a larger value. An image which is analyzed by the face detecting unit 1 does not have to have the same size as the input image, and a reference input image which is reduced so that a face can be detected may be used. The face detecting unit 1 may execute a reducing process on the input image so as to generate a reference input image.

The parameter calculation control unit 2 determines a correction parameter calculating method according to the detected result of the face detecting unit 1, so as to make a control so that this method is carried out. The parameter calculation control unit 2 makes a control how to calculate a correction parameter (namely, which unit (component) calculates the correction parameter) on the basis of the information about presence/non-presence of a face from the face detecting unit 1. In the first embodiment, when a face is not yet detected, the parameter calculation control unit 2 controls the standard correction parameter calculating unit 4 to calculate the correction parameter, and when a face is detected, control the face area correction parameter calculating unit 3 to calculate the correction parameter.

The face area correction parameter calculating unit 3 calculates a correction parameter based on a luminance component of a face area of an input image. The face area correction parameter calculating unit 3 can calculate a correction parameter by using a reference input image instead of an input image. The face area correction parameter calculating unit 3 includes a face center area setting unit 11, a representative luminance calculating unit 12 and a correction parameter calculating unit 13 as shown in FIG. 2. FIG. 2 is a block diagram illustrating a constitutional example of the face area correction parameter calculating unit 3. The face detecting unit 1 and the face center area setting unit 11 become face area extracting units.

The face center area setting unit 11 sets a face center area on an image according to a coordinate of a feature point of the face output from the face detecting unit 1. The face center area is an area to which a person pays an attention at the time of seeing a face, namely, a area which is surrounded by both eyes and a mouth in the first embodiment. FIG. 3 is an explanatory diagram illustrating a setting example of the face center area. As shown in FIG. 3, the face center area 101 can be defined as a rectangular area based on a distance w between both eyes. As shown in FIG. 3, for example, when a width for connecting both the eyes is regarded as the distance w between the eyes, the face center area setting unit 11 sets the rectangular area surrounded by points which extend upward by 0.4 w and extend downward by 0.8 w on the basis of positions of both the eyes as the face center area. Besides the rectangular shape, the face center area may have any shapes such as an oval shape.

The representative luminance calculating unit 12 calculates a representative value of a luminance component of pixels included in the face center area. When the input image is a color image, an Y value of an XYZ coordinate system can be used as the luminance component. When the input image is a grey image, the pixel value may be directly used. Further, an average value, a median value, a maximum value and a minimum value can be used as the representative value of the luminance component, but as a result of experiments, the use of the average value provides the highest accuracy. Hereinafter, the representative value of the luminance component calculated by the representative luminance calculating section 12 is called as a representative luminance value.

The correction parameter calculating unit 13 calculates a correction parameter based on the representative luminance value calculated by the representative luminance calculating unit 12. When the face detecting unit 1 calculates the face detection reliableness, the correction parameter calculating unit 13 can calculate a correction parameter based on the representative luminance value and the face detection reliableness.

In the first embodiment, cases where a γ (gamma) value in the γ correction and a control point moving distance of a tone curve are used as the correction parameter are described as examples. The γ correction is generally correction of an error or the like caused by characteristics or the like of elements such that that the γ value showing a ratio of a change in a voltage converted value to a change in brightness of an image is moved closer to 1. In the first embodiment, correction expressed by the following formula (1) is called as the γ correction. In the formula (1), "R", "G", "B" show intensity of red, green and blue (three primary colors) light, and "R'", "G'" and "B'" show "R", "G" and "B" after the γ correction. Further, in the formula (1), "a" is a constant. In the γ correction expressed by the formula (1), the correction is made so that when γ<1, the intensity becomes high, and γ>1 the intensity becomes low.

$$R'=a(R)\gamma$$
$$G'=a(G)\gamma$$
$$B'=a(B)\gamma \quad \text{Formula (1)}$$

Further, when "R", "G" and "B" fall within a range of 0 to 255, the γ correction can be expressed by the following formula (2).

$$R'=255\cdot(R/255)\gamma$$
$$G'=255\cdot(G/255)\gamma$$
$$B'=255\cdot(B/255)\gamma \quad \text{Formula (2)}$$

FIG. 4 is an explanatory diagram illustrating one example of a tone curve obtained by the γ correction. The tone curve is a conversion characteristic curve when an input RGB value (pixel value before the correction) is plotted along an lateral-axis, and an output RGB value (pixel values after the correction) is plotted along an vertical-axis. In the γ correction, the conversion characteristic curve shown in FIG. 4 is used for R, G and B. Since the tone curve shown in FIG. 4 lifts up in comparison with a straight line of 45°, it shows that the input image is corrected to be made to be bright by the γ correction.

When the γ value is calculated as the correction parameter, the γ value is calculated from the representative luminance value on the basis of characteristics at the time of converting the representative luminance value Yf into the γ value (hereinafter, conversion characteristics). FIG. 5 is an explanatory diagram illustrating one example of the conversion characteristics from the representative luminance value Yf into the γ value. FIG. 5 illustrates linear conversion characteristics 41 and non-linear conversion characteristics 42 as examples of the conversion characteristics to be used in the present invention.

The correction parameter calculating unit 13 calculates the γ value by using a linear primary expression (linear transformation) on the basis of the linear conversion characteristics 41. Further, the γ value may be calculated by using a non-linear function or a lookup table on the basis of the non-linear conversion characteristics 42. The lookup table (hereinafter, the lookup table 1) is a table in which the γ value determined based on the non-linear conversion characteristics 21 is recorded for possible values of the representative luminance.

The following formula (3) is one example of a conversion equation to be used for the correction parameter calculating unit 13 calculating the γ value based on the linear conversion characteristics 41. In the formula (3), "α" and "β" are constants.

$$\gamma = \alpha Yf + \beta \quad \text{formula (3)}$$

Further, when the face detecting unit 1 calculates the face detection reliableness L, the correction parameter calculating unit 13 can calculate the weighted γ value (γ') using the following formula (4). In the formula (4), when the face detection reliableness is high, the γ value calculated based on the representative luminance value is weighted by a large value, and when the reliableness is low, the weighting of γ0 as a default parameter is enlarged. In the formula (4), the face detection reliableness L obtains an actual number of $0 \leq L \leq 1$, <and as the value is larger, the reliableness is higher. A formula (5) is a formula which is obtained by rewriting the formula (4) into an expression where the γ value calculation method is not limited.

$$\gamma' = L \times (\alpha Yf + \beta) + (1-L) \times \gamma 0 \quad \text{Formula (4)}$$
$$\gamma' = L \times \gamma + (1-L) \times \gamma 0 \quad \text{Formula (5)}$$

In the present invention, a certain standard is provided to the conversion characteristics. That is to say, as shown in FIG. 5, on the basis of a predetermined level (hereinafter, boundary luminance level), the correction parameter is calculated based on the conversion characteristics having characteristics such that as the representative luminance value Yf is lower, the image becomes brighter (the γ value is reduced) and as the representative luminance value is higher, the image becomes darker (the γ value is increased). The boundary luminance level is set in advance to a luminance value for providing preferable skin color according to use areas.

The constants to be used in the calculating formulas and the contents of the lookup table 1 are stored in the storage device of the tone correcting apparatus in advance as the need arises. A plurality of conversion characteristics are enabled to be used in advance, and a user may specify it. When a user adjusts the boundary luminance value, the stored constants and contents of the lookup table 1 are updated according to the boundary luminance value.

Figure 6:
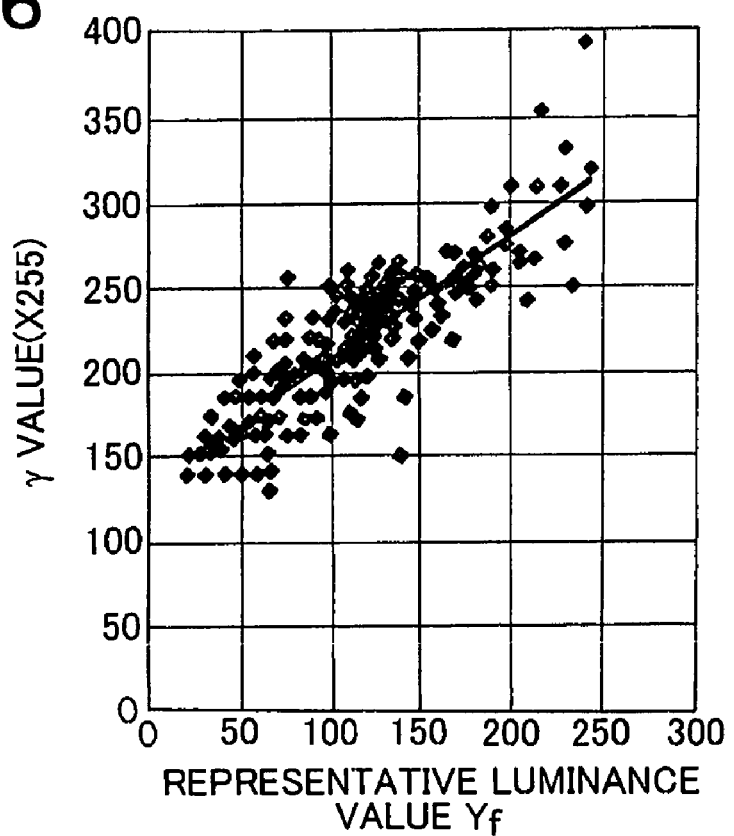
FIG. 6 is a plot chart expressing a relationship between the representative luminance value and an optimum γ value, the relationship being obtained by subjective appraisal experiment.

FIG. 6 is a plot chart illustrating a relationship between the representative luminance value Yf and an optimum γ value, the relationship being obtained by subjective appraisal experiments. The optimum γ value is a γ value when a figure image is corrected to an image which an estimator thinks preferable in the case where the estimator manually adjusts the γ correction of the figure image. As shown in FIG. 6, the representative luminance value Yf of the face center area is positively correlated with the optimum γ value. It is found that as the representative luminance value Yf is larger, the image is corrected darker, and as the representative luminance value Yf is smaller, the image is corrected brighter. Therefore, the experimental result in FIG. 6 backs up that the optimum γ correction can be realized by calculating the correction parameter based on the conversion characteristics having the standard determined by the present invention.

Figures 7, 8:
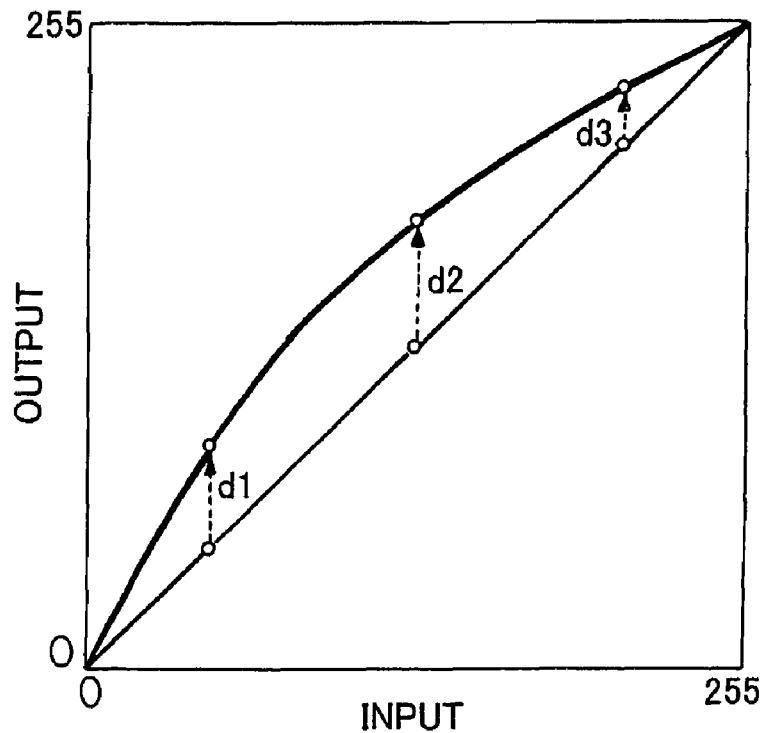
FIG. 7 is an explanatory diagram illustrating one example of a tone curve obtained by a control point moving distance of the tone curve.
FIG. 8 is an explanatory diagram illustrating one example of a conversion table for converting the representative luminance value into the moving distance of the control point.

The control point moving distance of the tone curve may be obtained as the correction parameter. The control point moving distance of the tone curve is a moving distance of the luminance value determined as the control point to a vertical-axis direction based on a straight line of 45° in a graph where the tone curve is drawn as shown in FIG. 7, namely, information showing the correction amount of a predetermined input luminance value. FIG. 7 is an explanatory diagram illustrating one example of the tone curve obtained by the control point moving distance (d1, d2 and d3) of the tone curve. The control point moving distance of the tone curve can be obtained by using a conversion table in which the moving distances of the control points corresponding to the possible representative luminance values are registered as shown in FIG. 8. FIG. 8 is an explanatory diagram illustrating one example of the conversion table for converting the representative luminance value into the control point moving distance of the tone curve.

Also in the control point moving distance, the conversion table which has characteristics such that as the representative luminance value Yf is smaller, the control point moves to a brighter direction (the value changes greatly to a plus direction), and as the representative luminance value Yf is larger, the control point moves to darker direction (the value changes greatly to a minus direction) is used. The control point moving distance does not show the moving distance of the respective control points but the correction amount of the entire luminance values. In FIG. 7, three points are determined as the control points, but their number is not limited to three. That is to say, for example, one middle point or three or more points may be determined as long as an approximation formula of the tone curve based on the characteristics can be derived from the moving distances of the control points. The contents of the conversion table are stored in the storage device of the tone correcting apparatus in advance. The values of the tone curve by means of the γ correction drawn based on the γ values described above may be recorded in the conversion table. The control point moving distance of the tone curve is described as the moving distance in the vertical-axis direction, but the control point moving distance can be defined as the moving distance in a lateral-axis direction. In the case where it is defined as the moving distance in the lateral-axis direction, when the control points move greatly to a left direction, the image is converted into a bright one, and when the control points move greatly to a right direction, the image is converted into a dark one.

The standard correction parameter calculating unit 4 calculates a standard correction parameter using image data of the input image. The standard correction parameter calculating unit 4 calculates the correction parameter based on the image data in the whole input image or in a predetermined evaluation area. The standard correction parameter calculating unit 4 can calculate the correction parameter using a reference input image instead of the input image. The standard correction parameter calculating unit 4 may calculate the correction parameter based on an average value of the luminance values on respective small areas obtained by dividing the image regardless of the contents of the image. Further, the calculation may be made based on not only the average value but also a minimum value, a maximum value, or a difference value between the minimum value and the maximum value.

The image converting unit 5 converts the pixel values of the input image on the basis of the correction parameter so as to correct tone of the whole input image. The image converting section 5 operates the pixel values using the correction parameter so as to convert the image value. For example, when the gamma value is calculated as the correction parameter, the image converting unit 5 calculates values after the γ correction for possible values (for example, 0 to 255) of the components (for example, R, G and B) to be γ-corrected according to the γ correction formula (2), and records the values in a predetermined storage area so as to create a lookup table. The lookup table here (hereinafter, the lookup table 2) is a table in which the values after the correction to be calculated by using the correction parameter for possible values of the components whose tone is to be corrected are recorded. As expressed by the formula (2), since the components R, G and B to be γ-corrected are corrected by using the same calculating formula, the lookup table 2 can be used commonly. In such a manner, since the pixel values are converted by using the lookup table in which the calculated values obtained by calculating possible values of the components to be corrected in the components of the pixel values using the correction parameter are recorded, the operation for obtaining the correction amount does not have to be performed for each pixel. Further, since images with output size are not synthesized, a large-capacity memory is not required, and a high-speed correcting process can be executed.

When the control point moving distance of the tone curve is calculated as the correction parameter, the image converting unit 5 obtains an approximation formula of the tone curve based on the moving distances of all the control points, and calculates the corrected values for the possible values (for example, 0 to 255) of the components whose tone is to be corrected according to the obtained approximation formula so as to create the lookup table 2. The approximation formula of the tone curve can be obtained from the luminance values after the correction represented by the moving distances of the control points according to an interpolating method such as linear interpolation or spline interpolation.

That is to say, the image converting unit 5 creates the lookup table 2 in which the corrected values calculated by using the correction parameter are registered for the possible values of the components whose tone is to be corrected are recorded. The image converting unit 5 makes table conversion using the values of the components whose tone is to be corrected in the components of the pixel values of the input image as inputs using the created lookup table 2, so as to correct the tone of the whole input image.

In the first embodiment, the face detecting unit 1, the parameter calculation control unit 2, the face area correction parameter calculating unit 3, the face center area setting unit 11, the representative luminance calculating unit 12, the correction parameter calculating unit 13, the standard correction parameter calculating unit 4 and the image converting unit 5 are realized by a CPU which operates according to programs.

Figure 9:
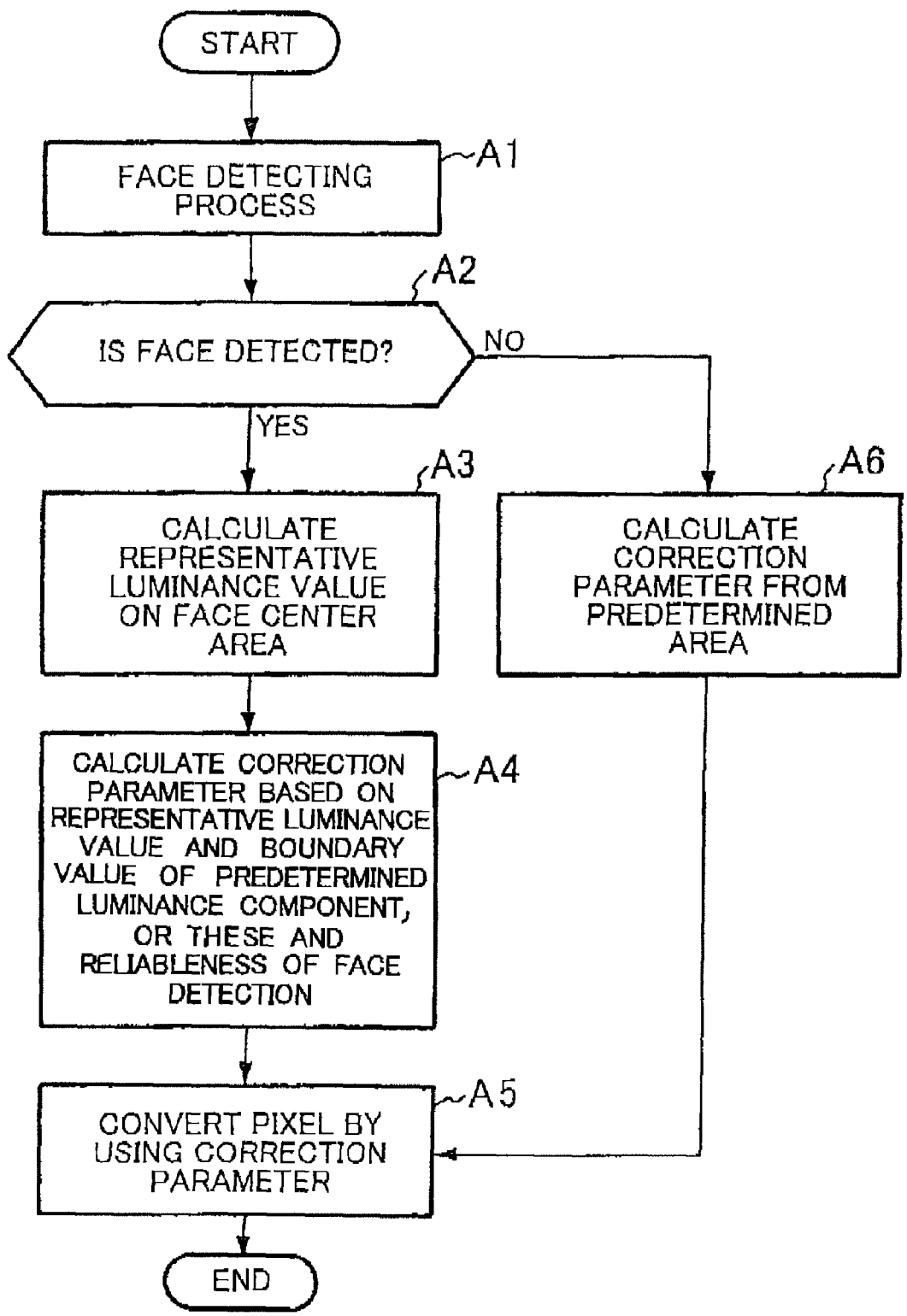
FIG. 9 is a flow chart illustrating an operating example of the tone correcting apparatus according to the first embodiment.
Figure 18:
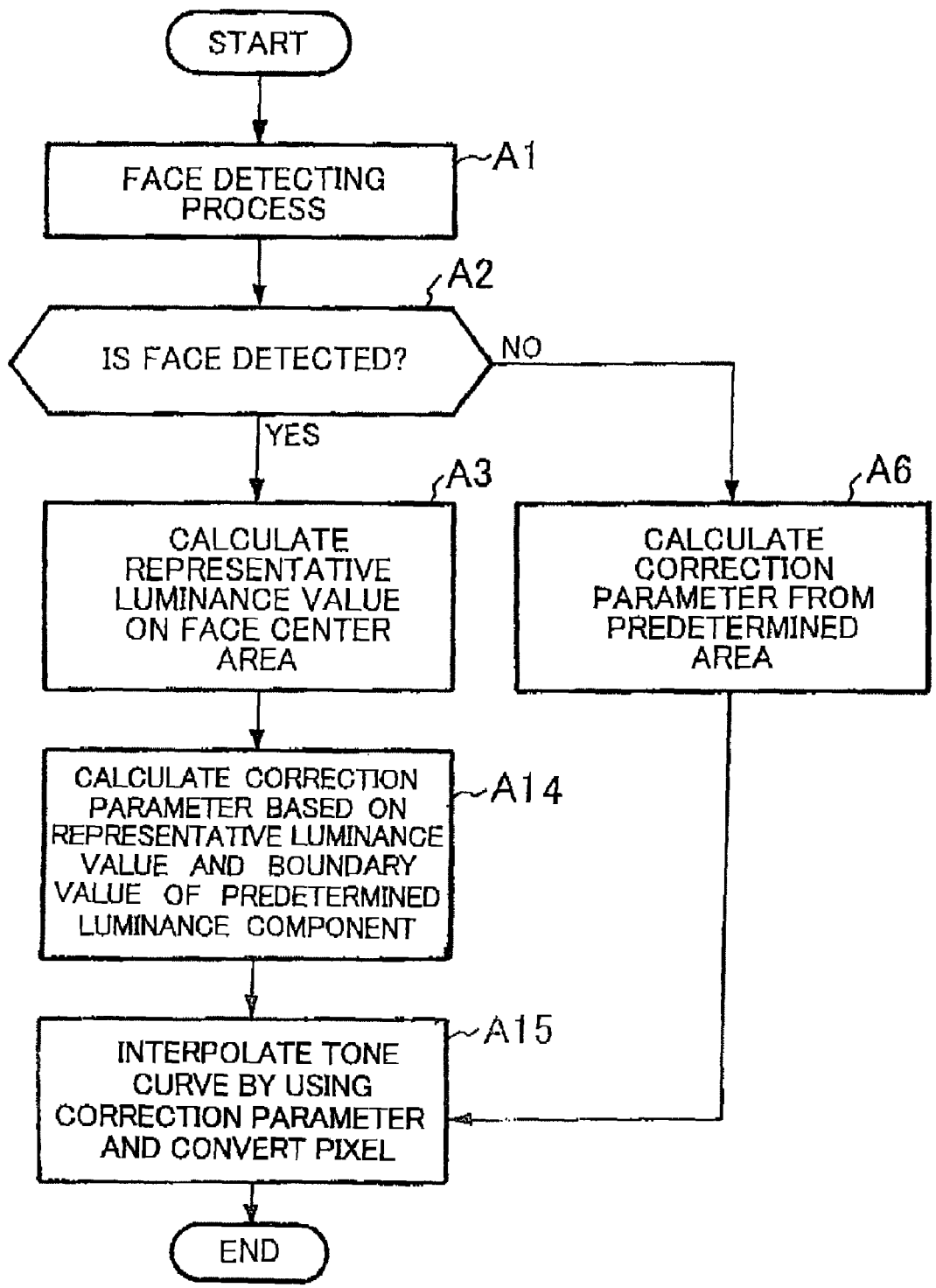
FIG. 18 is a flow chart illustrating another operating example of the tone correcting apparatus according to the first embodiment.

Operations in the first embodiment are described below with reference to FIGS. 9 and 18. FIG. 9 is a flow chart illustrating an operating example of the tone correcting apparatus according to the first embodiment and FIG. 18 is a flow chart illustrating another operating example of the tone correcting apparatus according to the first embodiment. When an input image to be corrected is input, the face detecting unit 1 executes a face detecting process (step A1). The face detecting unit 1 refers to a reference input image obtained by reducing the input image so as to detect a face using pattern recognition. When the face is detected, the face detecting unit 1 detects a position of the face. The face detecting unit 1 outputs the face detected result and information representing the position of the face (for example, position coordinates of both eyes). The face detecting unit 1 may calculate face detection reliableness at the time of detecting the face. The parameter calculation control unit 2 determines whether the face is detected (step A2). When the face is detected (Yes at step A2), the parameter calculation control unit 2 instructs the face area correction parameter calculating unit 3 to calculate a correction parameter.

The face area correction parameter calculating unit 3 receives the instruction from the parameter calculation control unit 2, and calculates the correction parameter based on the luminance value of the face area in the reference input image. The face center area setting unit 11 determines a face center area on the reference input image on the basis of the information representing the position of the face detected by the face detecting unit 1. The representative luminance calculating section 12 calculates a representative luminance value from the pixel values included in the face center area determined by the face center area setting unit 11 (step A3). The representative luminance calculating unit 12 obtains an average value of the luminance values of the pixels included in the face center area, for example, as the representative luminance value.

The correction parameter calculating unit 13 calculates a correction parameter based on the representative luminance value calculated by the representative luminance calculating unit 12 (steps A4 and A14). The correction parameter calculating unit 13 may calculate a γ value in the γ correction based on the representative luminance value by using a linear primary formula or a non-linear function or the lookup table 1 which has conversion characteristics such that the correcting direction and the correction amount change according to the representative luminance value on the basis of the boundary luminance level. Further, the correction parameter calculating unit 13 may calculate the control point moving distances of the tone curve on the basis of the representative luminance value by using the conversion table which has characteristics such that the correcting direction and the correction amount change according to the representative luminance value based on the boundary luminance level. When the face detecting unit 1 calculates the face detection reliableness, the correction parameter calculating unit 13 may carry out weighting by means of the face detection reliableness between the calculated correction parameter and the default parameter.

When a face is not detected (No at step A2), the parameter calculation control unit 2 instructs the standard correction parameter calculating unit 4 to calculate a correction parameter. The standard correction parameter calculating unit 4 calculates a standard correction parameter using the image data of the reference input image. The standard correction parameter calculating unit 4 calculates the correction parameter based on the pixel values included in a predetermined area of the reference input image, for example (step A6).

The image converting unit 5 converts the pixel values of the input image using the calculated correction parameter (steps A5 and A15). When the γ value is calculated as the correction parameter, the image converting unit 5 calculates values after the γ correction for possible values of components of the pixel values to be γ-corrected according to the γ correction formula so as to create the lookup table 2. Further, when the control point moving distances of the tone curve are calculated as the correction parameter, the image converting unit 5 obtains an approximation formula of the tone curve based on the moving distances of all the control points, and calculates values after corrected for possible values of components whose tone is to be corrected according to the obtained approximation formula so as to create the lookup table 2. The image converting unit 5 converts the values of the components of the pixel values whose tone is to be corrected using the created lookup table for the pixels of the input image so as to update these values. The image converting unit 5 converts the pixel values of all the pixels of the input image so as to correct the tone of the input image.

In the first embodiment, since the face on the image is detected and the tone of the whole image is corrected by using the correction parameter calculated based on the luminance information on the center area of the face (representative luminance value), the tone correction such that a dark face on a backlight image is made to be bright can be realized. Further, since the correction parameter is calculated based on the characteristics such that the correcting direction and the correction amount are changed according to the representative luminance value on the basis of the boundary luminance level, the tone correction can be realized for the backlight image, and also the tone correction where a fluctuation is repressed can be realized for an image on which the face is photographed with the follow light. That is to say, since the tone correction is made based on the representative luminance value according to the boundary luminance level which is preset to luminance values for providing a preferable skin color, a figure image with good visibility can be provided.

Since the correction parameter can be calculated by using only the reference input image and the synthesization according to the output size is not carried out, a large-capacity memory is not necessary. Since a complicated operation such as logarithmic conversion is not used at the time of calculating the correction parameter and the lookup table 2 is created at the time of the image conversion so the table conversion is carried out, the process can be executed at high speed.

Second Embodiment

Figure 10:
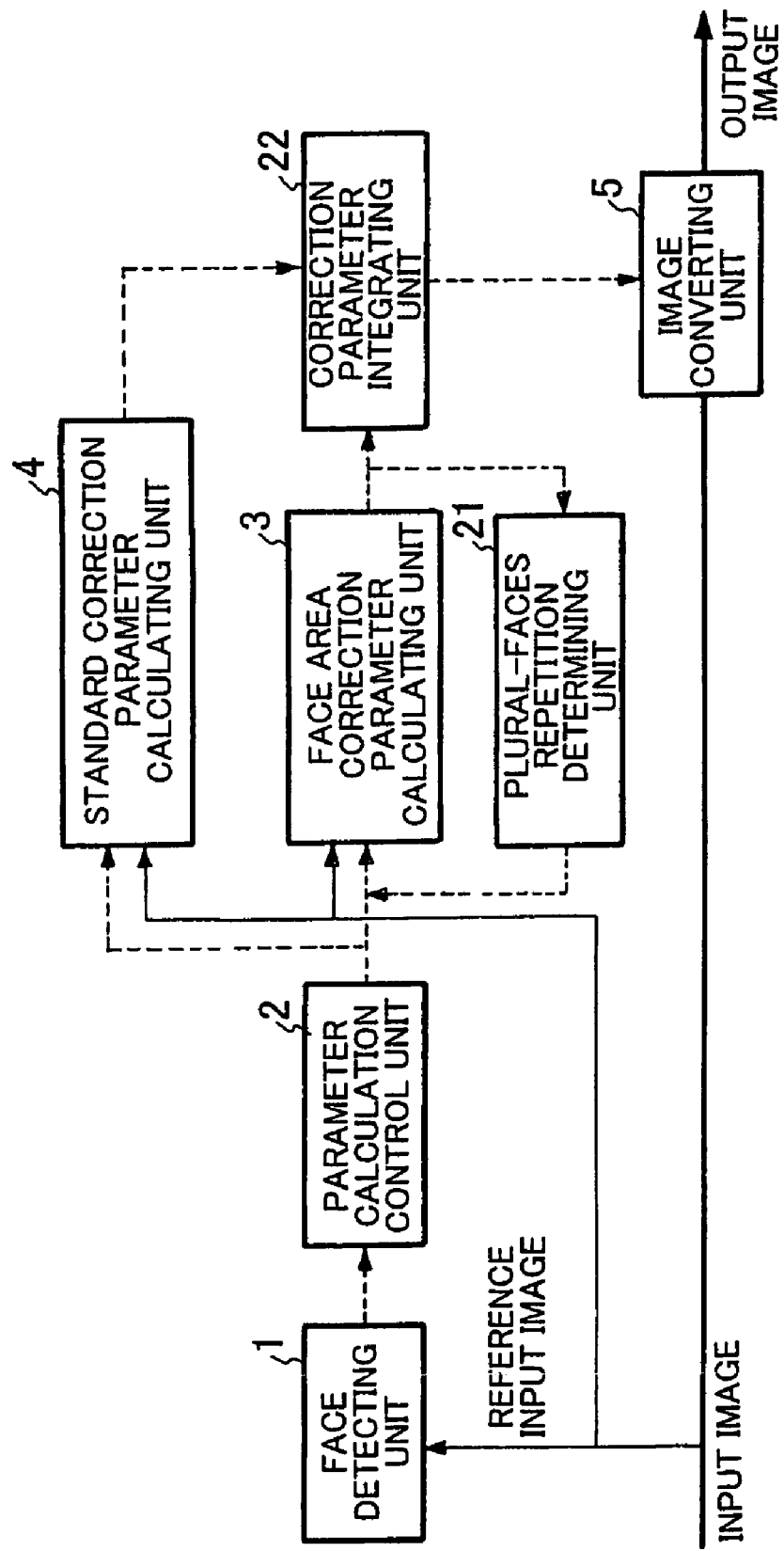
FIG. 10 is a block diagram illustrating a constitutional example of the tone correcting apparatus according to a second embodiment.

A second embodiment of the present invention is described below with reference to the drawings. FIG. 10 is a block diagram illustrating a constitutional example of the tone correcting apparatus according to the second embodiment. The tone correcting apparatus shown in FIG. 10 has the face detecting unit 1, the parameter calculation control unit 2, the face area correction parameter calculating unit 3, a plural-faces repetition determining unit 21, the standard correction parameter calculating unit 4, a correction parameter integrating unit 22, and the image converting unit 5. The tone correcting apparatus shown in FIG. 10 is different from the first embodiment shown in FIG. 1 in that the plural-faces repetition determining unit 21 and the correction parameter integrating unit 22 are added.

When a plurality (N-number) of faces is detected, the plural-faces repetition determining unit 21 makes a control so that the correction parameters corresponding to the N-number of face areas are calculated. The plural-faces repetition determining unit 21 repeatedly instructs the face area correction parameter calculating unit 3 until the correction parameters corresponding to the N-number of face areas are calculated. When a plurality of faces is detected, the correction parameter integrating unit 22 integrates the correction parameters calculated correspondingly to the respective face areas. The correction parameter integrating unit 22 may get an average of the correction parameters so as to integrate the correction parameters. Further, when the face detecting unit 1 calculates the face detection reliableness, as shown in the following formula (6), the integration may be carried out by weighted mean. In the formula (6), the number of face detections is "N", the face detection reliableness is "L(N)", and the correction parameters calculated correspondingly to the face areas (hereinafter, γ value) are "γ(N)".

[Mathematical Formula 1]

$$\gamma = \frac{\sum_{n=1}^{N} L(N) \cdot \gamma(N)}{\sum_{n=1}^{N} L(N)} \quad \text{Formula (6)}$$

The correction parameters of the plurality of faces may be subject to weighted mean average using sizes of the faces as the integration example. For example, the correction parameters may be integrated according to the following formula (7) by using the distances between both eyes as the face sizes. In the formula (7), "D(N)" shows the distance between both eyes. The distance D(N) can be calculated based on the output from the face detecting unit 1.

[Mathematical Formula 2]

$$\gamma = \frac{\sum_{n=1}^{N} D(N) \cdot \gamma(N)}{\sum_{n=1}^{N} D(N)} \quad \text{Formula (7)}$$

The correction parameter integrating unit 22 outputs the integrated correction parameter as the integrated correction parameter. Further, when the number of face detections is 0 and the correction parameter calculated by the standard correction parameter calculating unit 4 is input, the correction parameter integrating unit 22 may output the correction parameter directly as the integrated correction parameter. The image converting unit 5 converts the pixel values using the integrated correction parameter output from the correction parameter integrating unit 22.

In the second embodiment, the plural-faces repetition determining unit 21 and the correction parameter integrating unit 22 are realized by the CPU which operates according to programs.

Figure 11:
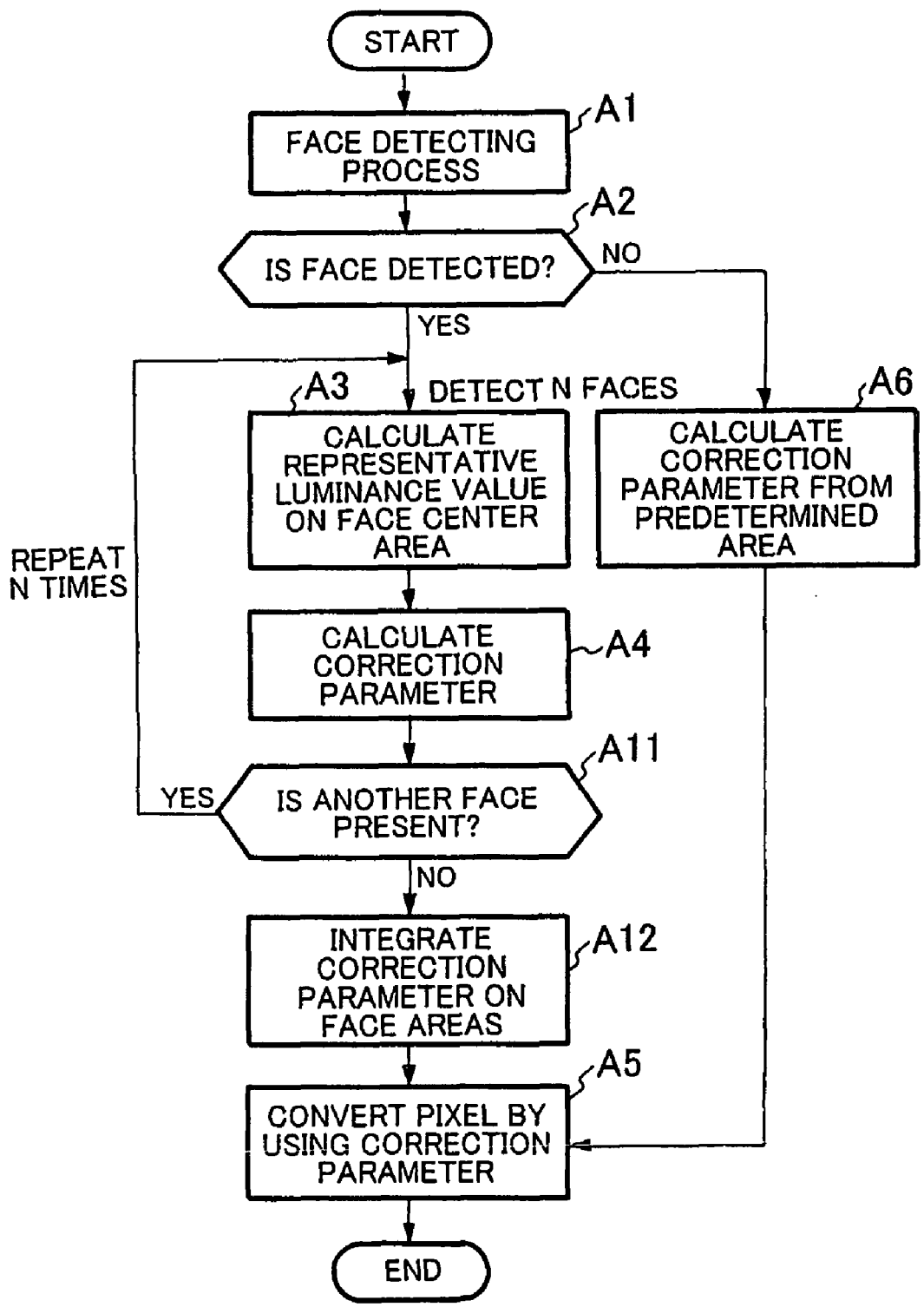
FIG. 11 is a flow chart illustrating an operating example of the tone correcting apparatus according to the second embodiment.

An operation of the second embodiment is described below with reference to FIG. 11. FIG. 11 is a flow chart illustrating an operation example of the tone correcting apparatus according to the second embodiment. Since steps A, A2 and A5 and steps A5 and A6 are similar to those in the first embodiment shown in FIG. 9, the description thereof is omitted. When the face detecting unit 1 executes the face detecting process (step A1), the N-number of faces is detected. The face area correction parameter calculating unit 3 receives the instruction from the parameter calculation control unit 2 so as to calculate a correction parameter based on the luminance values of the face areas on the reference input image.

The plural-faces repetition determining unit 21 makes a control so that the operations of steps A3 and A4 are performed on the detected all N-number of face areas. When the face area correction parameter calculating unit 3 finished to calculate the correction parameter corresponding to one face area, the plural-faces repetition determining unit 21 determines whether the other face areas are present (step A11). When the other faces are present (Yes at step A11), the plural-faces repetition determining unit 21 instructs the face area correction parameter calculating unit 3 to calculate the correction parameter corresponding to the next face area (returns to step A3). When the other faces are not present, the plural-faces repetition determining unit 21 outputs the correction parameter corresponding to the calculated N-number of faces to the correction parameter integrating unit 22.

The correction parameter integrating unit 22 integrates the correction parameters corresponding to the N-number of faces, so as to calculate the integrated correction parameter (step A12). The correction parameter integrating unit 22 gets the average of the correction parameters so as to calculate the integrated correction parameter. Further, when the face detecting unit 1 calculates the face detection reliableness, the correction parameter integrating unit 22 may get the weighted mean (weighted average) using the face detection reliableness or the size of the face so as to calculate the integrated correction parameter. The image converting unit 5 converts the respective pixel values of the input image on the basis of the integrated correction parameter or the correction parameter calculated by the standard correction parameter calculating unit 4 (step A5). When correction parameter calculated by the standard correction parameter, calculating unit 4 are input, the correction parameter integrating unit 22 may output the correction parameter directly as the integrated correction parameter.

According to the second embodiment, since all the face areas on the image are weighted and simultaneously integrated, the correction where the balance of the whole image is maintained is enabled, thereby preventing a bad influence of the correction from being exerted upon the whole image due to an influence of a specific face.

Third Embodiment

Figure 12:
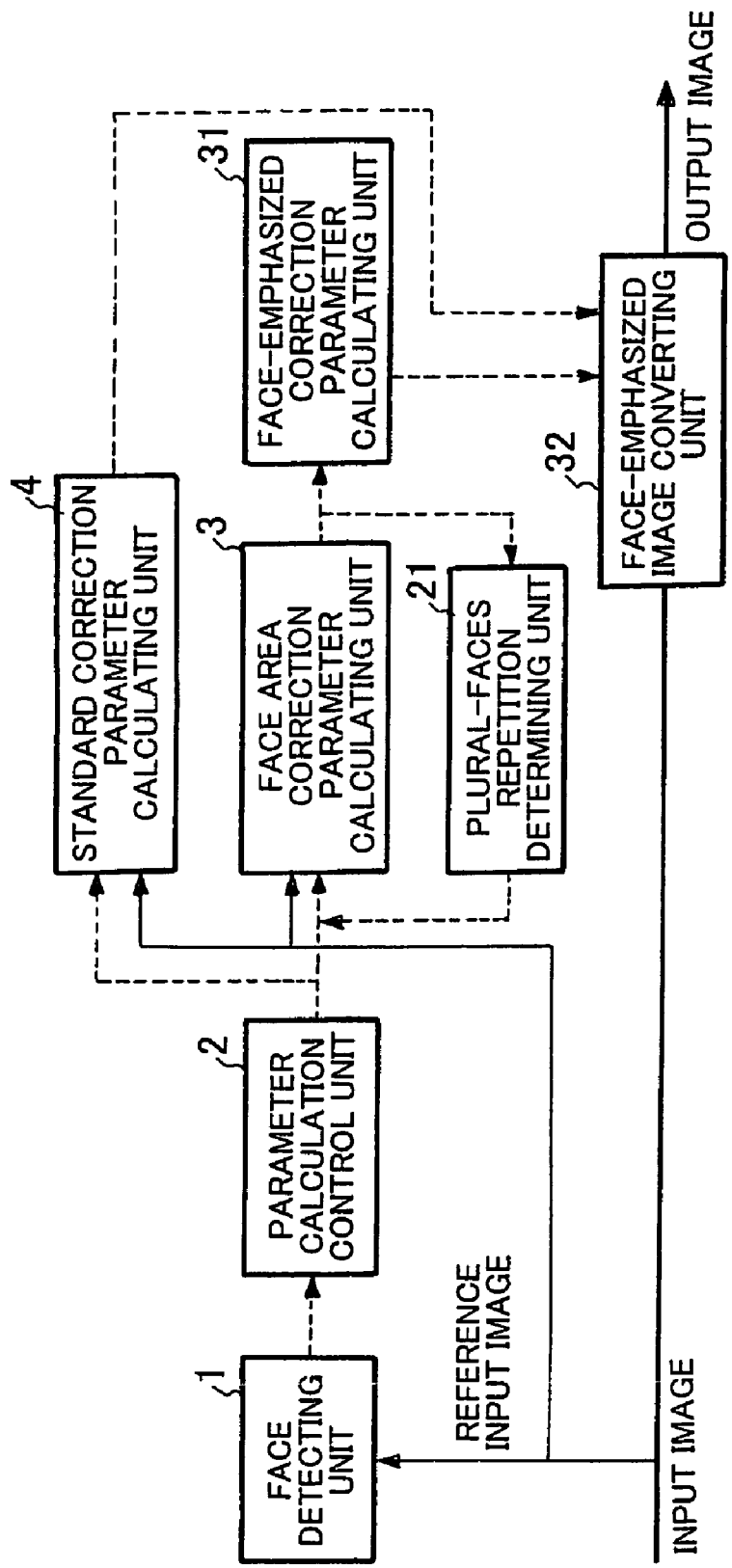
FIG. 12 is a block diagram illustrating a constitutional example of the tone correcting apparatus according to a third embodiment.

A third embodiment of the present invention is described below with reference to the drawings. FIG. 12 is a block diagram illustrating a constitutional example of the tone correcting apparatus according to the third embodiment. The tone correcting apparatus shown in FIG. 12 has the face detecting unit 1, the parameter calculation control unit 2, the face area correction parameter calculating unit 3, the plural-faces repetition determining unit 21, the standard correction parameter calculating unit 4, a face-emphasized correction parameter calculating unit 31, and a face-emphasized image converting unit 32. The tone correcting apparatus shown in FIG. 12 is different from the second embodiment shown in FIG. 10 in that the face-emphasized correction parameter calculating unit 31 is added instead of the correction parameter integrating unit 22 and the face-emphasized image converting unit 32 is added instead of the image converting unit 5.

The face-emphasized correction parameter calculating unit 31 uses the correction parameters corresponding to the face areas calculated by the face area correction parameter calculating unit 3 so as to calculate a correction parameter map for correcting respective face center areas intensively. The face-emphasized image converting unit 32 converts the tone of specific areas intensively on the basis of the correction parameter map calculated by the face-emphasized correction parameter calculating unit 31.

In the third embodiment, the correction parameters are treated as the correction parameter map which fluctuates depending on a coordinate value (x, y) on the image, so that the correcting effect of the face areas can be large. The face-emphasized correction parameter calculating unit 31 expresses the correction parameters (here, γ value) on the coordinates as a function Γ(x, y) shown by the following formula (8). Hereinafter, the function Γ(x, y) is called as a correction parameter map function. The face-emphasized correction parameter calculating unit 31 calculates the correction parameters on all the coordinates on the image according to the correction parameter map function, on the basis of the detected coordinates of the face center areas.

$$\gamma = \Gamma(x, y) \qquad \text{Formula (8)}$$

More specifically, the face-emphasized correction parameter calculating unit 31 creates the correction parameter map function Γ(x, y) representing the correction parameters on all the coordinates on the image, on the basis of the detected coordinates of the face center areas and their correction parameters.

An example of the correction parameter map function Γ(x, y) is a function which utilizes a two-dimensional Gaussian distribution function expressed by the following formula (9). In the formula (9), "N" is the number of face detections, γi is a correction parameter corresponding to i (1≦i≦N)-th face area, "(x0,y0)" is a center coordinate of the i-th face area, and "σi" is a parameter which changes according to a size of the i-th face center area (when an area of the face center area is large, "σi" obtains a large value, and when an area of the face center area is small, "σi" obtains a small value).

[Mathematical Formula 3]

$$\Gamma(x, y) = \sum_{n=1}^{N} (\gamma_i \cdot W(x, x_0, y, y_0, \sigma_i)) \qquad \text{Formula (9)}$$

$$W(x, x_0, y, y_0, \sigma_i) = \frac{1}{2\pi\sigma_i^2} \exp\left(-\frac{(x - x_i)^2 + (y - y_i)^2}{2\sigma_i^2}\right)$$

In the formula (9), the correction parameter map function Γ(x, y) is defined by a format such that after the correction parameter γi corresponding to each face area is weighted by a weighting function W, summation is obtained. The weighting function W may be a function which reduces the correction parameters with increasing distance from the center coordinate of the face, and it is not limited to the format expressed by the formula (9). Further, the output values of the weighting function W can be stored as a table in advance.

Figure 13:
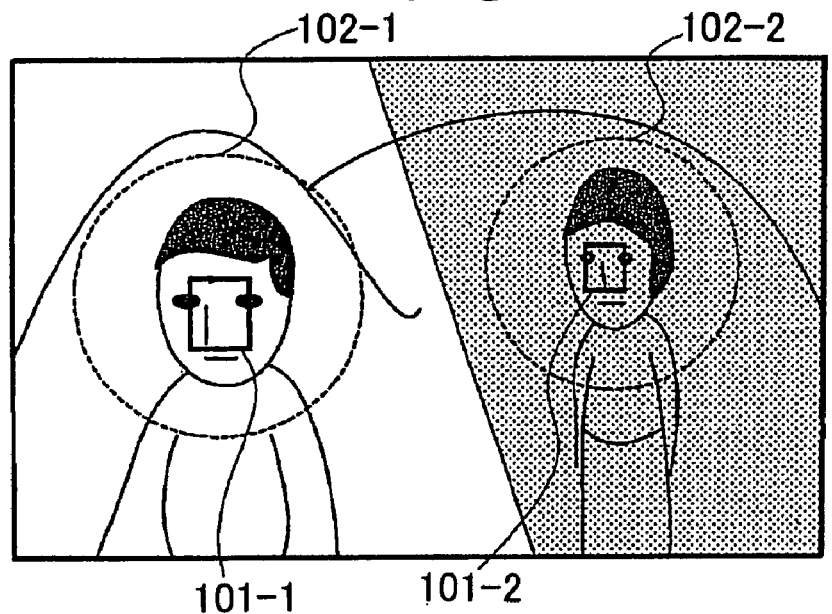
FIG. 13 is an explanatory diagram illustrating one example of an input mage including a plurality of faces.

FIG. 13 illustrates one example of the input image including a plurality of faces. The face detecting unit 1 detects a first face center area 101-1 and a second face center area 101-2. FIG. 13 illustrates a range where an influence of correction on the first face center area 101 is dominating as a first face influence range 102-1, and a range where an influence of the correction on the second face center area 101-2 is dominating as a second face influence range 102-2.

Figure 14:
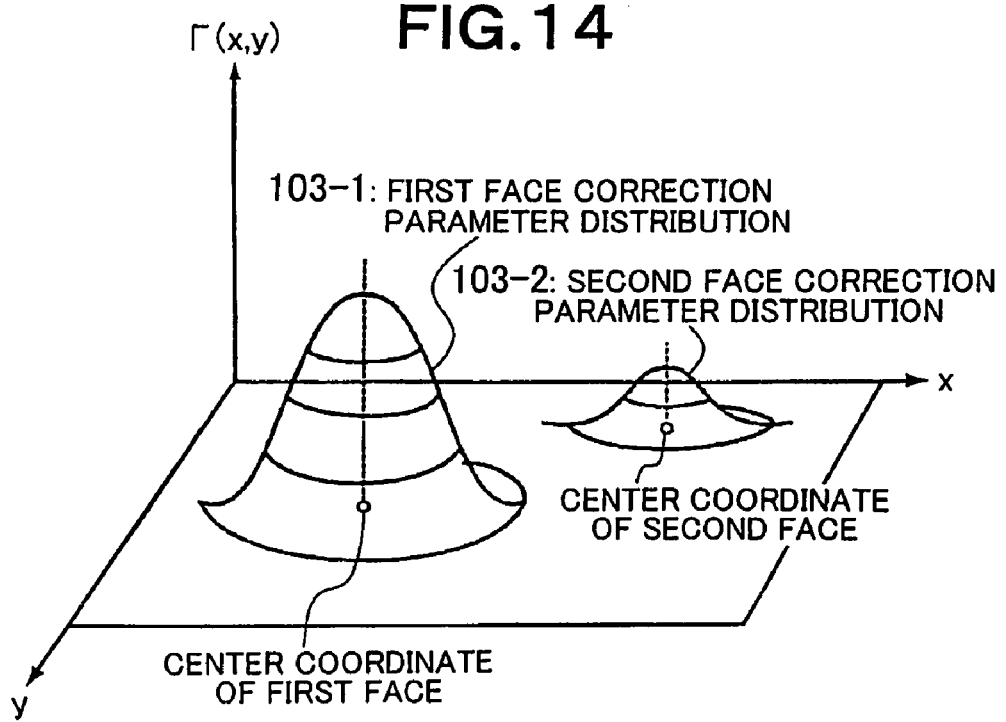
FIG. 14 is an explanatory diagram where a correction parameter mapping function is expressed by a graph.

FIG. 14 is an explanatory diagram illustrating one example of the correction parameter map function Γ(x, y) generated based on the face detected result of FIG. 14 in a graph form. FIG. 14 illustrates correction parameter distribution obtained based on the correction parameter corresponding to the first face center area 101-1 as first face correction parameter distribution 103-1, and correction parameter distribution obtained based on the correction parameter corresponding to the second face center area 101-2 as second face correction parameter distribution 103-2.

As shown in FIG. 13, since the luminance value in the first face center area 101-1 is large, the correction parameter around the face center on the first face correction parameter distribution 103-1 of FIG. 14 (here, γ value) becomes large. On the other hand, since the luminance value in the third face center area 101-2 is small, the correction parameter around the face center in the second face correction parameter distribution 103-2 of FIG. 14 becomes smaller than that in the first correction parameter distribution 103-1.

The face-emphasized image converting unit 32 converts the pixel values of the input image using the correction parameter map function Γ(x, y) generated by the face-emphasized correction parameter calculating unit 31 so as to correct the tone of the whole input image. The face-emphasized image converting unit 32 captures the pixels of the input image on coordinate axes, and performs an operation on the pixel values on the basis of the correction parameters on the coordinate represented by the correction parameter map function Γ(x, y) so as to convert the pixel values.

The face-emphasized image converting unit 32 converts the pixel values represented by all the coordinates on the input image so as to correct the tone of the whole input image. When the correction parameter map function Γ(x, y) shows no correction (0 as γ value) on a certain coordinate, the converting process is not executed on the pixel value shown by this coordinate. Further, when the number of face detections is 0, similarly to the first embodiment, the face-emphasized image converting unit 32 converts the pixel values of the input image using the correction parameters calculated by the standard correction parameter calculating unit 4.

In the third embodiment, the face-emphasized correction parameter calculating unit 31 and the face-emphasized image converting unit 32 are realized by the CPU which operates according to programs.

According to the third embodiment, the correction parameters according to the plurality of faces can be set. Since only face areas and their vicinities are corrected and the correction can be made according to the respective faces can be made, bad influences of the correction due to the influence of a specific face can be prevented from being exerted upon the whole image.

When the correction amount on each coordinate is calculated, the correction amount parameter map function is used, so that an unnecessary frame memory for image synthesization or the like does not have to be used.

The third embodiment describes the case where an image include a figure and a face area is extracted as a specific area from the image, but the specific area includes a case where the image includes an animal to be the specific area, a case where the image includes a building or a vehicle to be the specific area, and a case where the image includes a natural object such as a mountain and an island, and thus the specific area is not particularly limited. In the third embodiment, an input image is analyzed so that the specific area is automatically detected, but the image is displayed on a display device so that the specific area may be specified manually.

In the respective embodiments, the face detecting unit 1 and the face center area setting unit 11 do not have to be provided as long as an image is displayed on the display device and a specific area is specified manually so that a face area of the image (particularly, center area) can be extracted. Further, the standard correction parameter calculating unit 4 does not have to be provided, and in this case, also the parameter calculation control unit 2 is not necessary. That is to say, in the embodiments of the present invention, a constitution shown in FIG. 16 can be adopted. In the constitution of FIG. 16, information about the face center area on the image which is similar to the output from the face center area setting unit 11 of FIG. 2 is input into the representative luminance calculating unit 12.

The tone correcting apparatus in the embodiments can be used in image equipment such as video cameras, digital cameras and mobile phones with cameras, and printers having an image processing function.

FIG. 17 is a block diagram illustrating a constitution of mobile phone with a camera as the image equipment according to the embodiments of the present invention. A tone correcting program for correcting tone of images is stored in a ROM 104, and the tone correcting program is executed by a CPU 105 according to a procedure shown in the flow chart of FIG. 9. The RAM 106 stores image data input from an input/output unit 103, a transmitter/receptor 101 or an image pickup element 107 such as CCD, and necessary data for executing the program therein. The input image and the image output after the tone correction are displayed on the display unit 102 such as a liquid crystal display unit (LCD). The image output after the tone correction is saved in the RAM 106, or is output to a printer via the input/output unit 103, or is transmitted via the transmitter/receptor 101.

Various other variations may be made without departing from the spirit or the features of the present invention. Each of the above described embodiments is merely an example, and the present invention is not limited to the embodiments. The present invention is claimed in the claims, and is not restricted by the specification. Further, the scope of the invention includes all changes which come within the meaning and range of equivalency of the claims.

The invention claimed is:

1. A tone correcting apparatus for correcting tone of an image comprising:
   a representative luminance value calculating unit configured to calculate a representative luminance value representing luminance components of pixels included in a face area of the image;
   a correction parameter calculating unit configured to calculate a correction parameter as a correction amount at a representative point on a tone curve showing input-output characteristics of a pixel value of the image, on the basis of the representative luminance value and a boundary value of a predetermined luminance component; and a pixel converting unit configured to interpolate the tone curve on the basis of the correction parameter and converting the pixel value of the image.

2. A tone correcting apparatus for correcting tone of an image, comprising:
- a representative luminance value calculating unit configured to calculate a representative luminance value representing luminance components of pixels included in a specific area of the image;
- a correction parameter calculating unit configured to calculate a correction parameter as a γ value for γ-correcting the tone of the image by using linear transformation of the representative luminance value, on the basis of the representative luminance value and a boundary value of a predetermined luminance component; and on the basis of respective size of the plurality of face areas; and
- a pixel converting unit configured to convert a pixel value of the image by using the correction parameter.

3. A tone correcting apparatus for correcting tone of an image comprising:
- a representative luminance value calculating unit configured to calculate a representative luminance value representing luminance components of pixels included in a face area of the image;
- a correction parameter calculating unit configured to calculate a correction parameter for correcting the tone of the image, on the basis of the representative luminance value, a boundary value of a predetermined luminance component, and reliableness of face detection, the reliableness being a difference between a feature quantity of pattern recognition obtained at the time of the face detection and a feature quantity of the image or being an inverse number of the difference; and
- a pixel converting unit configured to convert a pixel value of the image by using the correction parameter.

4. A tone correcting apparatus for correcting tone of an image, comprising:
- A representative luminance value calculating unit configured to calculate representative luminance values representing luminance components of pixels included in a plurality of respective face areas of the image;
- a correction parameter calculating unit configured to calculate a plurality of correcting parameters for correcting the tones on plurality of face areas of the image on the basis of the representative luminance values and a boundary value of a predetermined luminance component so as to integrate the plurality of correction parameters on the basis of respective size of the plurality of face areas; and
- a pixel converting unit configured to convert a pixel value of the image by using the integrated correction parameter.

5. A tone correction method of a tone correcting apparatus for correcting tone of an image, comprising:
- a step of calculating, by the tone correcting apparatus, a representative luminance value representing luminance components of pixels included in a specific area of the image;
- a step of calculating, by the tone correcting apparatus, a correction parameter as a correction amount at a representative point on a tone curve showing input-output characteristics of a pixel value of the image, on the basis of the representative luminance value and a boundary value of a predetermined luminance component; and
- a step of interpolating, by the tone correcting apparatus, the tone curve on the basis of the correction parameter and converting the pixel value of the image.

6. A tone correcting method of a tone correcting apparatus for correcting tone of an image, comprising:
- a step of calculating, by the tone correcting apparatus, a representative luminance value representing luminance components of pixels included in a specific area of the image;
- a step of calculating, by the tone correcting apparatus, a correction parameter as a γ value for γ-correcting the tone of the image by using linear transformation of the representative luminance value, on the basis of the representative luminance value and a boundary value of a predetermined luminance component; and
- a step of converting, by the tone correcting apparatus, a pixel value of the image by using the correction parameter.

7. A tone correcting method of a tone correcting apparatus for correcting tone of an image, comprising:
- a step of calculating, by the tone correcting apparatus, a representative luminance value representing luminance components of pixels included in a face area of the image;
- a step of calculating, by the tone correcting apparatus, a correction parameter for correcting the tone of the image, on the basis of the representative luminance value, a boundary value of a predetermined luminance component, and reliableness of face detection, the reliableness being a difference between a feature quantity of pattern recognition obtained at the time of the face detection and a feature quantity of the image or being an inverse number of the difference; and
- a step of converting, by the tone correcting apparatus, a pixel value of the image by using the correction parameter.

8. A tone correcting method of a tone correcting apparatus for correcting tone of an image, comprising:
- a step of calculating, by the tone correcting apparatus, representative luminance values representing luminance components of pixels included in a plurality of face areas of the image;
- a step of calculating, by the tone correcting apparatus, a plurality of correction parameters for correcting the tones on plurality of face areas of the image on the basis of the representative luminance values and a boundary value of a predetermined luminance component so as to integrate the plurality of correction parameters on the basis of respective sizes of the plurality of face detection areas; and
- a step of converting, by the tone correcting apparatus, a pixel value of the image by using the integrated correction parameter.

9. A non-transitory computer readable medium storing a tone correcting program for correcting tone of an image, the program allowing a computer to execute:
- a process for calculating a representative luminance value representing luminance components of pixels included in a specific area of the image;
- a process for calculating a correction parameter as a correction amount at a representative point on a tone curve showing input-output characteristics of a pixel value of the image, on the basis of the representative luminance value and a boundary value of a predetermined luminance component; and
- a process for interpolating the tone curve on the basis of the correction parameter and converting the pixel value of the image.

10. A non-transitory computer readable medium storing a tone correcting program for correcting tone of an image, the program allowing a computer to execute:
- a process for calculating a representative luminance value representing luminance components of pixels included in a specific area of the image;
- a process for calculating a correction parameter as a γ value for γ-correcting the tone of the image by using linear transformation of the representative luminance value, on the basis of the representative luminance value and a boundary value of a predetermined luminance component; and
- a process for converting a pixel value of the image by using the correction parameter.

11. A non-transitory computer readable medium storing a tone correcting program for correcting tone of an image, the program allowing a computer to execute:
- a process for calculating a representative luminance value representing luminance components of pixels included in a face area of the image;
- a process for calculating a correction parameter for correcting the tone of the image, on the basis of the representative luminance value, a boundary value of a predetermined luminance component and reliableness of face detection, the reliableness being a difference between a feature quantity of pattern recognition obtained at the time of the face detection and a feature quantity of the image or being an inverse number of the difference; and
- a process for converting a pixel value of the image by using the correction parameter.

12. A non-transitory computer readable medium storing a tone correcting program for correcting tone of an image, the program allowing a computer to execute:
- a process for calculating representative luminance values representing luminance components of pixels included in a plurality of face areas of the image;
- a process for calculating a plurality of correction parameters for correcting the tones on plurality of face areas of the image on the basis of the representative luminance values and a boundary value of a predetermined luminance component so as to integrate the plurality of correction parameters on the basis of representative sizes of the plurality of face areas; and
- a process for converting a pixel value of the image by using the integrated correction parameter.

\* \* \* \* \*